US012415369B2

(12) United States Patent
Matsuura et al.

(10) Patent No.: US 12,415,369 B2
(45) Date of Patent: Sep. 16, 2025

(54) PRINTING APPARATUS, CONTROL METHOD THEREOF, AND STORAGE MEDIUM TO REDUCE A SIZE OF A PRINTING APPARATUS WITHOUT A DETERIORATION IN PRODUCTIVITY OF DOUBLE-SIDED PRINTING

(71) Applicant: CANON KABUSHIKI KAISHA, Tokyo (JP)

(72) Inventors: Masaaki Matsuura, Kanagawa (JP); Haruo Uchida, Kanagawa (JP); Shoichi Kan, Kanagawa (JP); Takaaki Ishida, Kanagawa (JP); Keisei Hakamata, Kanagawa (JP); Noriyuki Sugiyama, Kanagawa (JP); Motoyuki Taguchi, Tokyo (JP); Takahiro Kiuchi, Tokyo (JP); Yasunori Matsumoto, Kanagawa (JP); Yumi Mukoyama, Tokyo (JP); Junichi Kubokawa, Nagasaki (JP); Kyosuke Kamishima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 18/308,547

(22) Filed: Apr. 27, 2023

(65) Prior Publication Data

US 2023/0364927 A1 Nov. 16, 2023

(30) Foreign Application Priority Data

May 11, 2022 (JP) ................................ 2022-078302

(51) Int. Cl.
*B41J 3/60* (2006.01)
*B41J 11/00* (2006.01)
(Continued)

(52) U.S. Cl.
CPC ............. *B41J 3/60* (2013.01); *B41J 11/0055* (2013.01); *B41J 11/007* (2013.01); *B65H 7/02* (2013.01);
(Continued)

(58) Field of Classification Search
CPC ........ B41J 3/60; B41J 11/0055; B41J 11/007; B65H 7/02; B65H 15/004; B65H 9/006;
(Continued)

(56) References Cited

U.S. PATENT DOCUMENTS

2020/0024092 A1* 1/2020 Taniguchi ............. B65H 85/00

FOREIGN PATENT DOCUMENTS

JP 2020-015180 A 1/2020

* cited by examiner

*Primary Examiner* — Henok D Legesse
(74) *Attorney, Agent, or Firm* — Canon U.S.A., Inc. IP Division

(57) ABSTRACT

A printing apparatus includes a supply unit, a supply path, first and second conveyance paths, a printing unit, and an inversion roller. The first conveyance path conveys, to a first direction, a print medium. The printing unit prints an image on the two surface of the print medium. The inversion roller inverts a conveyance direction of the print medium and conveys the print medium in a second direction. The second conveyance path conveys the print medium conveyed in the second direction to the first conveyance path while inverting the print medium. When performing printing on both sides of print media, the print media are convey such that a first print medium supplied from the second conveyance path and a second print medium supplied from the supply path overlap in the first conveyance path.

14 Claims, 10 Drawing Sheets

(51) Int. Cl.

| | |
|---|---|
| ***B65H 7/02*** | (2006.01) |
| ***B65H 9/00*** | (2006.01) |
| ***B65H 15/00*** | (2006.01) |
| ***B65H 85/00*** | (2006.01) |
| *B65H 29/12* | (2006.01) |

(52) U.S. Cl.
CPC ............. *B65H 9/006* (2013.01); *B65H 9/008* (2013.01); *B65H 15/004* (2020.08); *B65H 85/00* (2013.01); *B65H 29/125* (2013.01); *B65H 2403/942* (2013.01); *B65H 2801/06* (2013.01); *B65H 2801/15* (2013.01)

(58) Field of Classification Search
CPC .......................... B65H 9/008; B65H 2403/942; B65H 29/125; B65H 85/00; B65H 2801/06; B65H 2801/15
See application file for complete search history.

PRINTING APPARATUS, CONTROL METHOD THEREOF, AND STORAGE MEDIUM TO REDUCE A SIZE OF A PRINTING APPARATUS WITHOUT A DETERIORATION IN PRODUCTIVITY OF DOUBLE-SIDED PRINTING

BACKGROUND

Field

The present disclosure relates to a printing apparatus that can perform double-sided printing by automatically inverting a print medium from the first surface to the second surface.

Description of the Related Art

In a printing apparatus that can perform printing on both sides of a print medium, a technique for improving productivity of double-sided printing has been proposed.

Japanese Patent Laid-Open No. 2020-015180 discloses the following technique. That is, during printing on the first print medium, the next print medium is fed, and after the printing on the first print medium is complete, the first print medium is conveyed to a conveyance path where the first print medium is inverted in the printing apparatus. In parallel to this, printing on the next print medium is performed. Then, after the printing on the next print medium is complete, the inverted first print medium is conveyed to a printing unit while conveying the next print medium to the conveyance path where the next print medium is inverted.

Here, in the technique described in Japanese Patent Laid-Open No. 2020-015180, a common intermediate roller is used to convey the print medium from a supply path to the printing unit and convey the print medium from the inversion path to the printing unit. Therefore, the print media cannot be overlapped and, during printing on the next print medium, the first print medium can only be drawn into the inversion path up to a position before the intermediate roller. In this case, in order to completely draw the first print medium into the inversion path, it is required to make the conveyance path length from the drawing portion to the intermediate roller larger than the maximum sheet length. This leads to issues such as an increase of the apparatus size.

SUMMARY

Applicant's disclosure relates to reducing the size of a printing apparatus without a deterioration in productivity of double-sided printing.

According to an aspect of the present disclosure, a printing apparatus includes a supply unit configured to supply a print medium, a supply path configured to convey the print medium supplied from the supply unit, a first conveyance path configured to convey the print medium from the supply path to a first direction, a printing unit configured to print an image on a first surface and a second surface on a back of the first surface of the print medium conveyed to the first direction through the first conveyance path, an inversion roller provided on a downstream side of the printing unit in the first direction, and capable of inverting a conveyance direction of the print medium and conveying the print medium in a second direction different from the first direction, and a second conveyance path configured to convey the print medium conveyed in the second direction by the inversion roller to the first conveyance path while inverting the print medium, wherein, when performing printing on both sides of a plurality of print media, the plurality of print media are convey such that a first print medium supplied from the second conveyance path and a second print medium supplied from the supply path overlap in the first conveyance path.

Further features of the present disclosure will become apparent from the following description of exemplary embodiments with reference to the attached drawings.

DESCRIPTION OF THE EMBODIMENTS

Figure 1A:
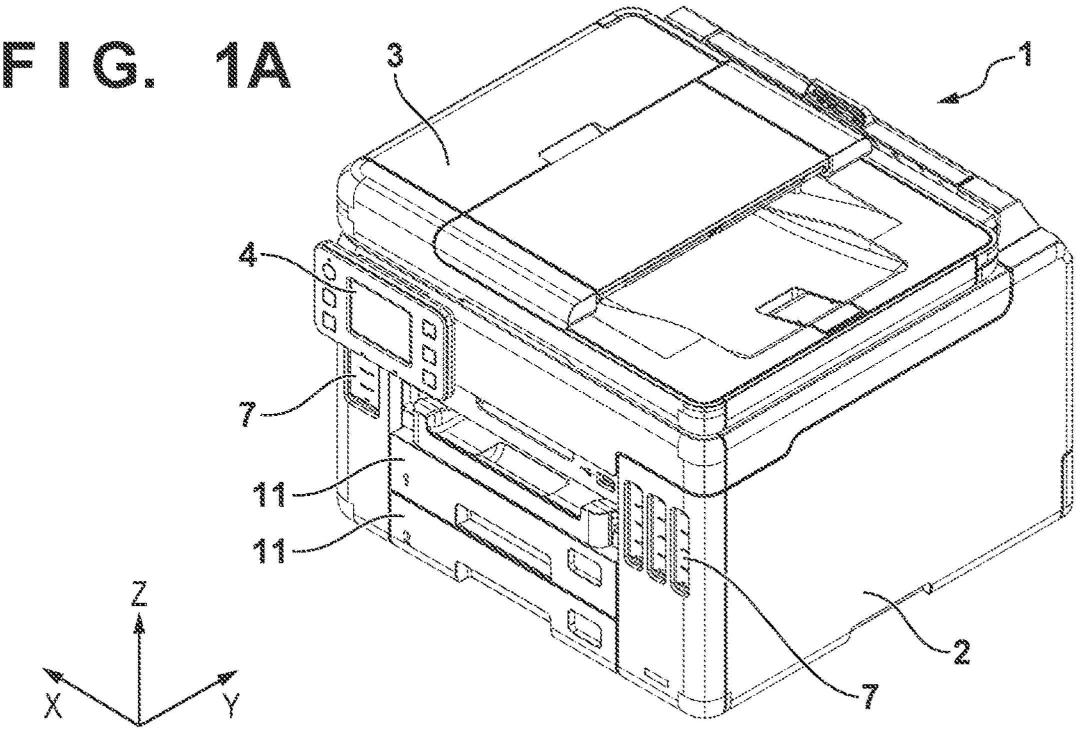
FIGS. 1A and 1B are perspective views showing the outer appearance of a printing apparatus according to an embodiment of the present disclosure.

Hereinafter, embodiments will be described in detail with reference to the attached drawings. Note, the following embodiments are not intended to limit the scope of the terms of the claims. Multiple features are described in the embodiments, but limitation is not made that requires all such features, and multiple such features may be combined as appropriate. Furthermore, in the attached drawings, the same reference numerals are given to the same or similar configurations, and redundant description thereof is omitted.

Hereinafter, a printing apparatus 1 according to an embodiment of the present disclosure will be described in detail with reference the accompanying drawings. Assume that the printing apparatus 1 is placed on a horizontal plane, the vertical direction is set as the Z direction, the printing direction and conveyance direction of a print medium P in a printing unit 8 are set as the Y direction, and the widthwise direction orthogonal to the Y-Z plane is set as the X direction.

<Overall Arrangement>

FIG. 1A is a perspective view showing the outer appearance of the printing apparatus 1 according to an embodiment of the present disclosure. The printing apparatus 1 has been formed in a cube shape as a whole. A reading device 3 is arranged on a main body 2 to be capable of opening/closing.

Figure 1B:
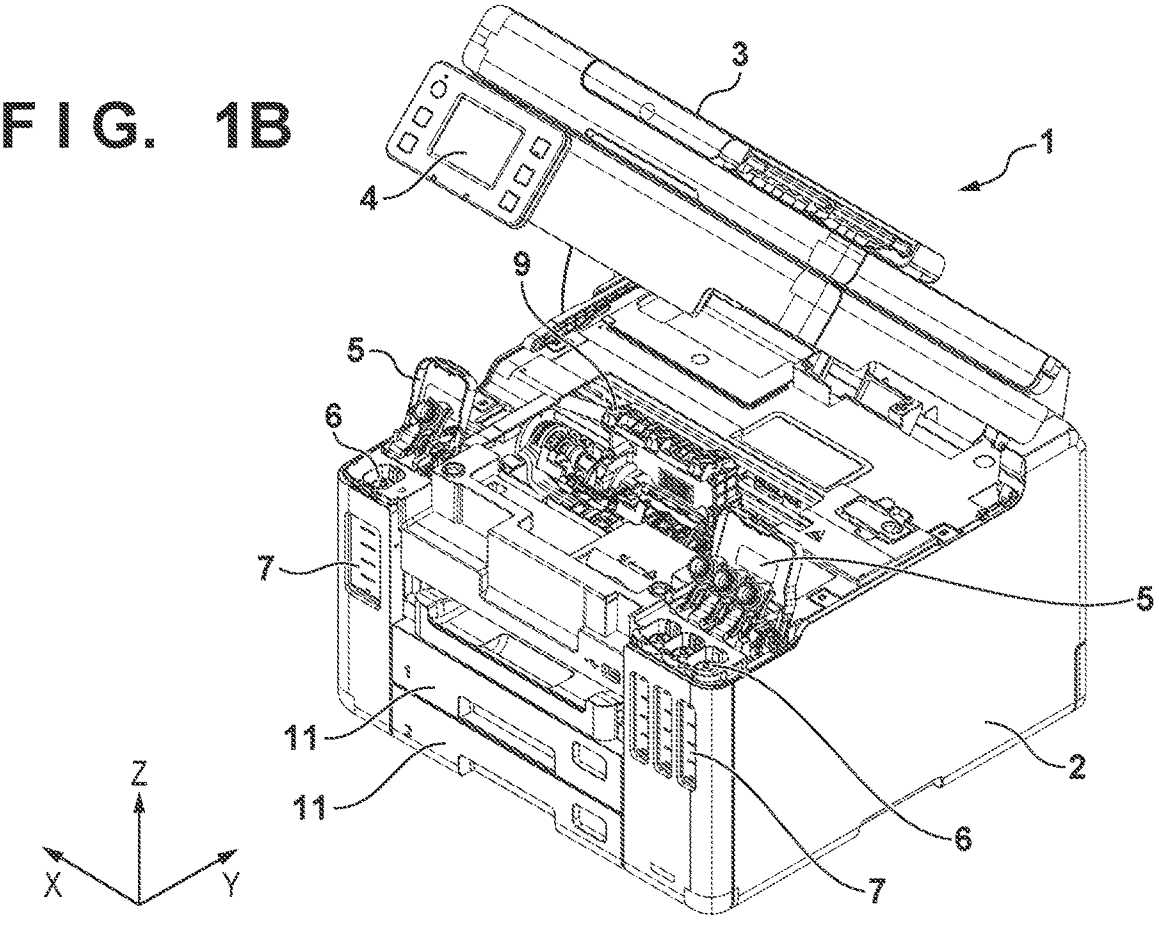

A display device 4 of touch panel type configured to accept a user operation is provided on the front surface of the main body 2. FIG. 1B shows a state in which the reading device 3 and ink tank covers 5 are opened. Each ink injection port 6 for injecting ink is provided in the front surface of the printing apparatus 1.

In FIGS. 1A and 1*i*, arrows X, Y, and Z indicate the widthwise direction, the depth direction, and the height direction of the printing apparatus 1, respectively, which are directions crossing each other (here, directions orthogonal to each other). This also applies to the arrows X, Y, and Z in other drawings.

The printing apparatus 1 is a serial inkjet printing apparatus that prints an image by discharging inks supplied from ink tanks 7 to a print medium. However, the present disclosure is also applicable to a serial printing apparatus of another type. Note that "print" includes not only formation of significant information such as a character or graphic pattern but also formation of an image, design, or pattern on a print medium in a broader sense or processing of a print medium regardless of whether the information is significant or insignificant or has become obvious to allow human visual perception. In this embodiment, a "print medium" is assumed to be a paper sheet but may be a fabric, plastic film, or the like.

Figure 2:
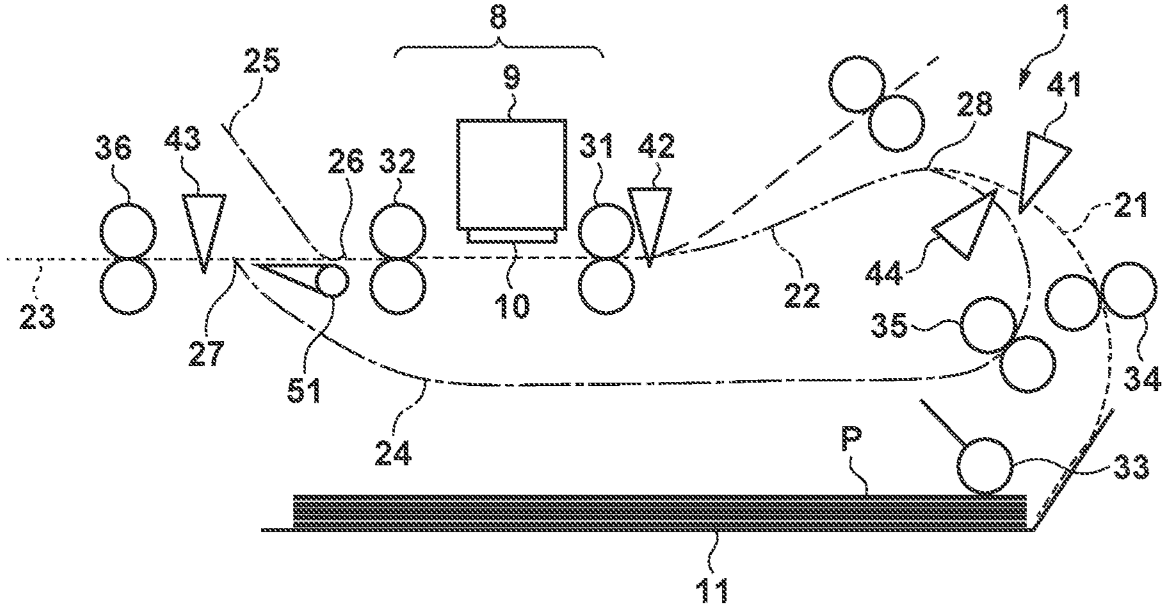
FIG. 2 is a sectional view of the printing apparatus.

FIG. 2 is a sectional view of the printing apparatus 1 according to this embodiment. The printing apparatus 1 includes a sheet stacking unit 11 where the print media P are stacked. The printing apparatus 1 further includes a supply path 21 corresponding to the conveyance path from the sheet stacking unit 11 to an inverted sheet merging portion 28, a first conveyance path 22 corresponding to the conveyance path from the inverted sheet merging portion 28 to a main conveyance roller 31, and an inversion path 23 corresponding to the conveyance path extending downstream of an inversion roller 36.

A discharge branch portion 26 and an inversion branch portion 27 are provided between a discharge roller 32 and the inversion path 23. Further, a discharge path 25 for conveyance from the discharge branch portion 26 to a discharge unit and a second conveyance path 24 for conveyance from the inversion branch portion 27 to the inverted sheet merging portion 28 are provided.

The printing unit 8 configured to perform printing on the print medium P is provided between the main conveyance roller 31 and the discharge roller 32. The print medium P is fed from the sheet stacking unit 11 to the supply path 21 by a feeding roller 33, and conveyed to the first conveyance path 22 by a first intermediate roller 34 provided in the supply path 21. The print medium P conveyed to the first conveyance path 22 is conveyed to the printing unit 8. Then, in the printing unit 8, printing is performed by a printhead 10 mounted on a carriage 9 that reciprocates in the X direction. The print medium P having undergone printing is conveyed to the inversion path 23 or the discharge path 25 on the downstream side of the printing unit 8 by the main conveyance roller 31 provided on the upstream side of the printing unit 8 and the discharge roller 32 provided on the downstream side of the printing unit 8.

A conveyance path switching unit (to be referred to as a flapper hereinafter) 51 is provided between the discharge branch portion 26 and the inversion branch portion 27. The flapper 51 switches the conveyance direction of the print medium P to the inversion path 23 or the discharge path 25. The inversion roller 36 is provided in the inversion path 23. During double-sided printing, the print medium P conveyed to the inversion path 23 is conveyed to the second conveyance path 24 by the inversion roller 36. At this time, the flapper 51 switches the conveyance direction so as not to convey the print medium P to the printing unit 8.

The print medium P conveyed to the second conveyance path 24 is conveyed to the first conveyance path 22 by a second intermediate roller 35 provided in the second conveyance path 24, and conveyed to the printing unit 8 by the main conveyance roller 31. The sum of the conveyance path length of the first conveyance path 22 and the conveyance path length of the second conveyance path 24 is substantially equal to or larger than the maximum length of the print medium on which the printing apparatus 1 can perform double-sided printing.

<Drive Configuration>

The printing apparatus 1 includes a plurality of driving sources. Each roller is rotated by the driving source in a forward direction for conveying the print medium P to the discharge direction, and in a backward direction opposite to the forward direction, thereby conveying the print medium P.

The feeding roller 33 and the first intermediate roller 34 are driven by the same driving source. If the print medium P has reached the first intermediate roller 34, transmission of the driving force to the feeding roller 33 is interrupted. A partially toothed gear, a clutch mechanism, or the like is used for the configuration of interrupting transmission of the driving force. The main conveyance roller 31 and the discharge roller 32 are driven by the same driving source. Each of the inversion roller 36 and the second intermediate roller 35 includes the driving source so that it can be driven independently. As can be understood from this, the first intermediate roller 34 and the second intermediate roller 35 include the driving sources independent of each other.

<Conveyance Control>

As shown in FIG. 2, a first sensor 41, a second sensor 42, a third sensor 43, and a fourth sensor 44, each of which is a sheet detection sensor that can detect the leading end position and trailing end position (end portion positions) of the print medium P, are provided in the respective conveyance paths. The feeding and conveyance timings of the print medium P are decided based on the detection results of the first to fourth sensors 41 to 44, and the respective driving sources start and stop driving based on the detection results of the first to fourth sensors 41 to 44.

Figure 3A:
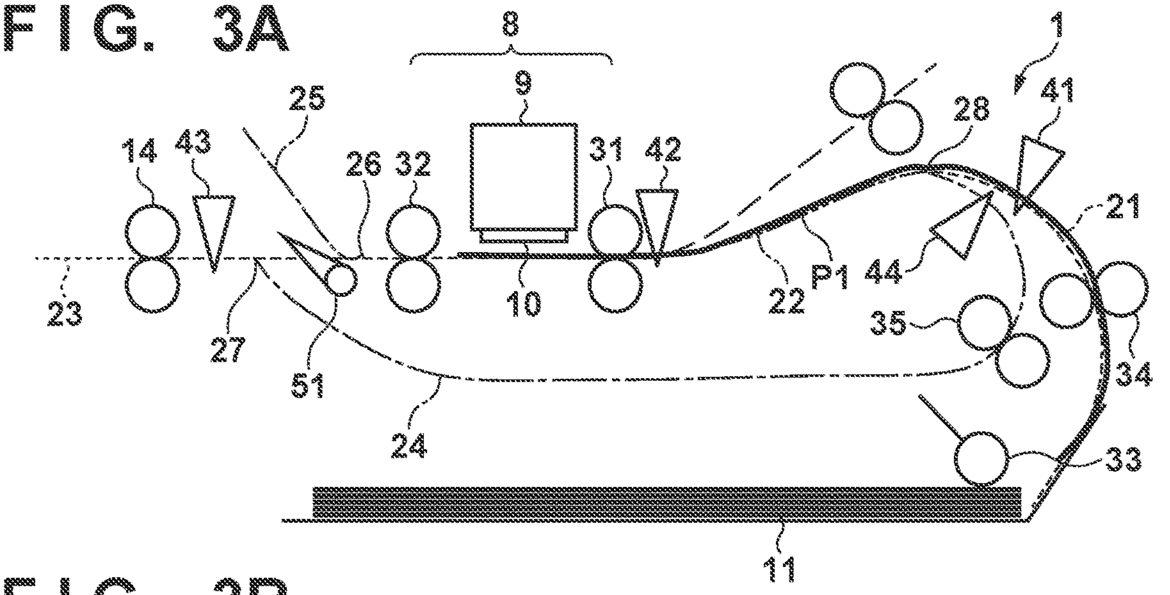
FIGS. 3A to 3C are views showing conveyance of print media in a case of performing single-sided printing on a plurality of print media.
Figure 3B:
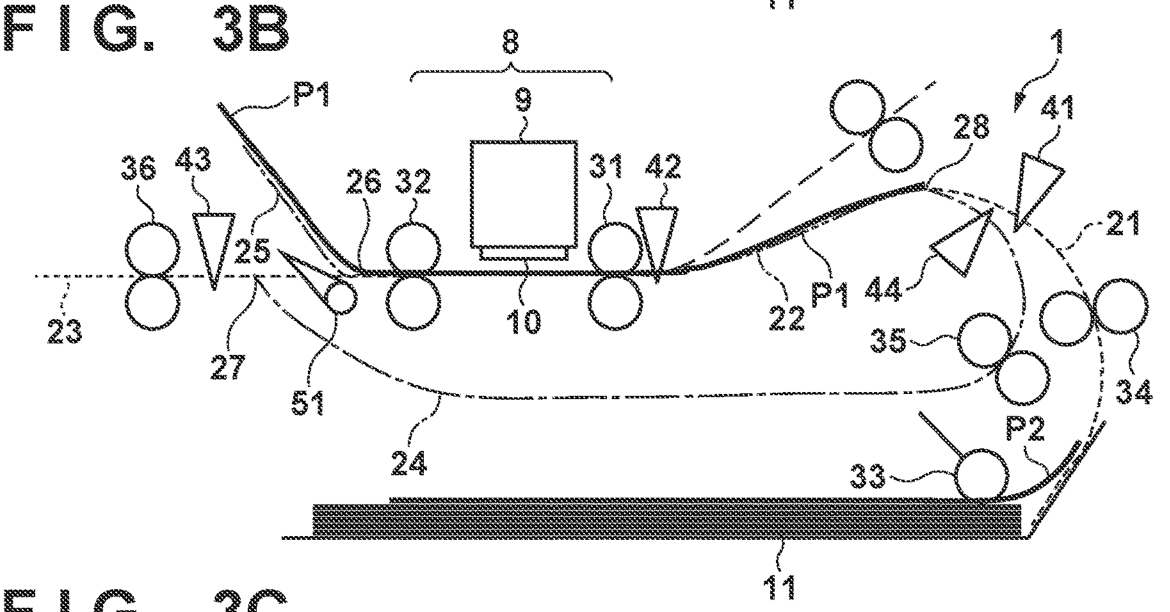
Figure 3C:
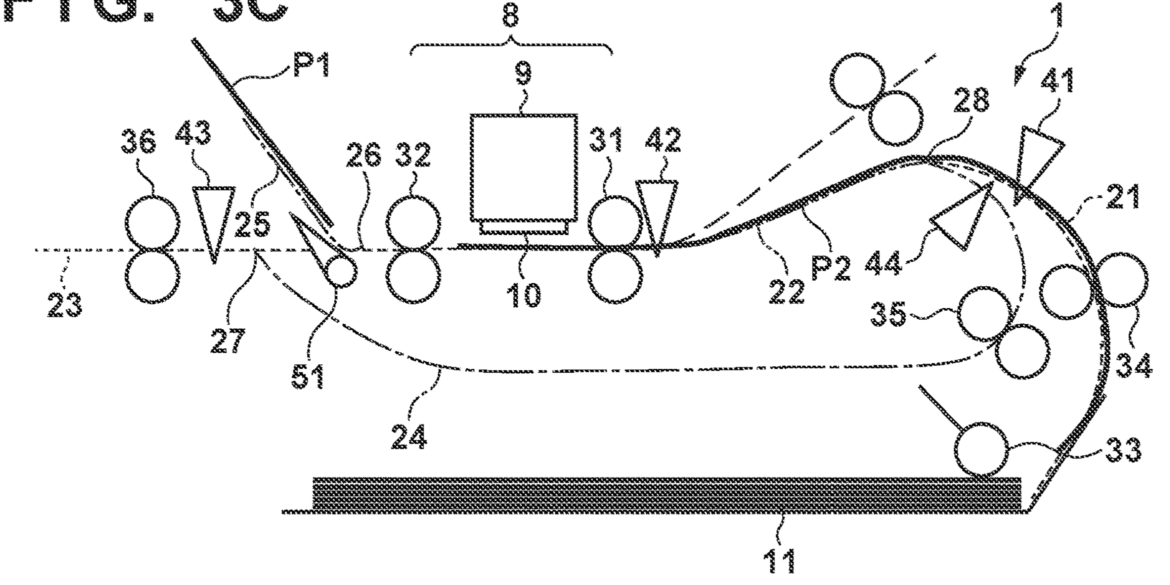

FIGS. 3A to 3C are views showing conveyance of the print media Pin a case of performing single-sided printing on a plurality of print media. A first print medium P1 fed from the sheet stacking unit 11 is conveyed through the supply path 21 and the first conveyance path 22, undergoes printing on the first surface by the printing unit 8 (FIG. 3A), and is conveyed to the discharge path 25. At this time, to prevent the print medium P from being conveyed to the inversion path 23, the flapper 51 switches the conveyance direction to the discharge path 25.

After the trailing end of the first print medium P1 is detected by the first sensor 41 provided in the supply path 21 and the first print medium P1 is conveyed by a predetermined amount after the detection of the trailing end, a second print medium P2 is fed from the sheet stacking unit 11 (FIG. 3B). The fed second print medium P2 undergoes printing on the first surface by the printing unit 8, and is conveyed to the discharge path 25 (FIG. 3C). Single-sided printing on a plurality of print media is performed by repeating a series of operations described above.

FIGS. 4A to 4D are views showing conveyance of the print medium P in a case of performing double-sided printing on one print medium. The first print medium P1 fed from the sheet stacking unit 11 is conveyed through the supply path 21 and the first conveyance path 22, undergoes printing on the first surface by the printing unit 8 (FIG. 4A), and is conveyed to the inversion path 23. In this case, the flapper 51 switches the conveyance direction so as to prevent the print medium P from being conveyed to the discharge path 25.

Figure 4A:
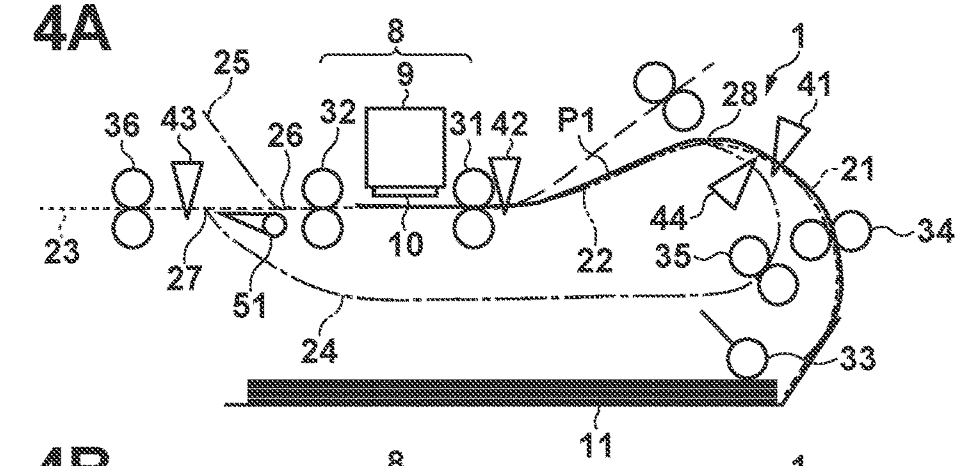
FIGS. 4A to 4D are views showing conveyance of the print medium in a case of performing double-sided printing on one print medium.
Figure 4B:
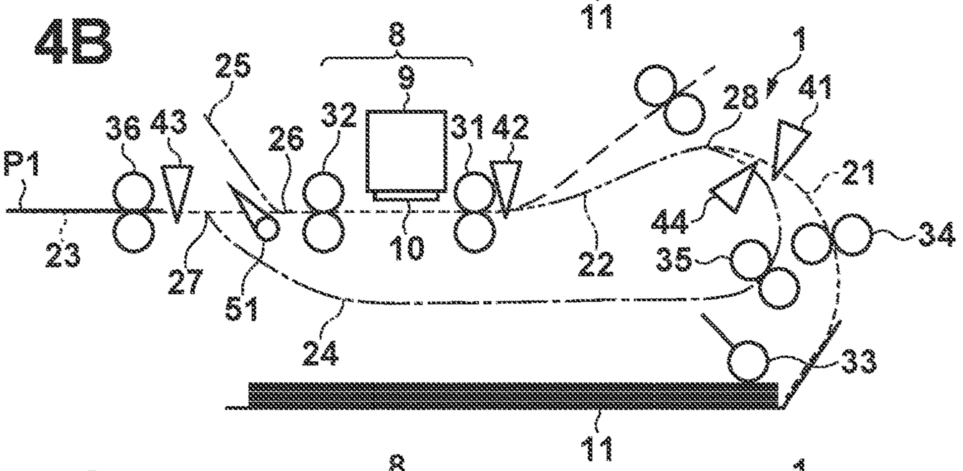
Figure 4C:
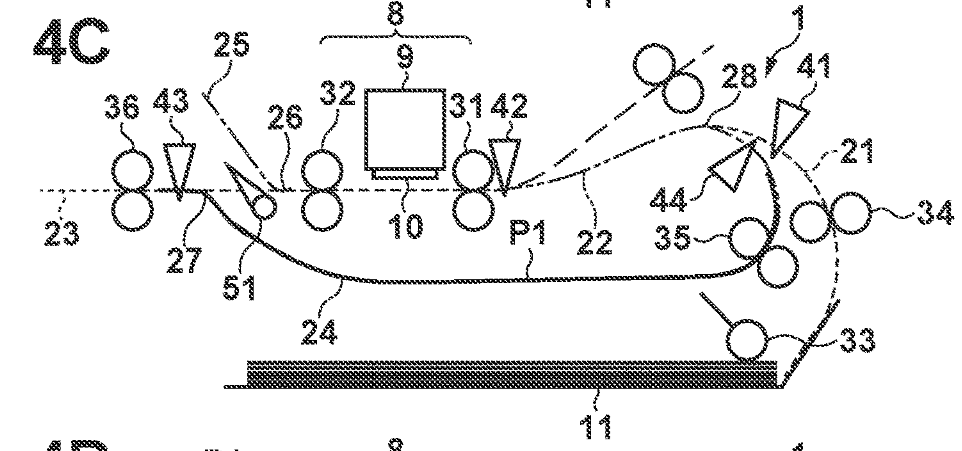
Figure 4D:
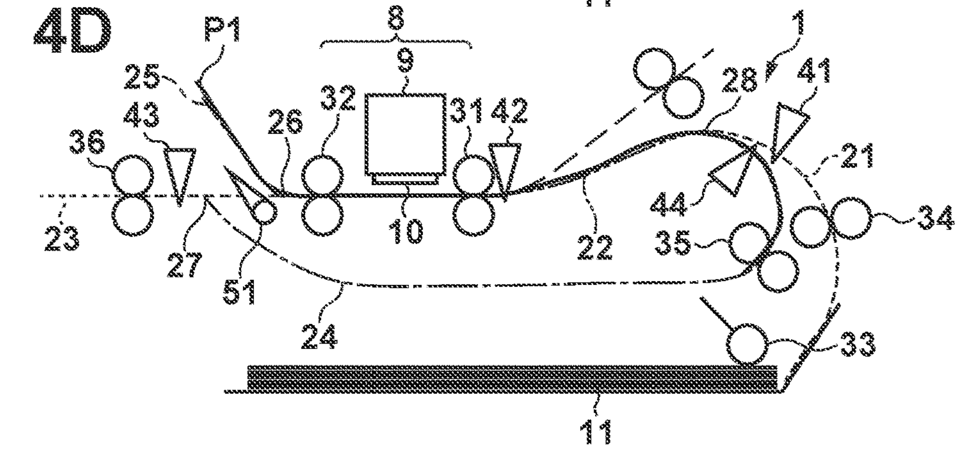

After the trailing end of the first print medium P1 is detected by the third sensor 43 provided in the inversion path 23, the driving direction of the inversion roller 36 is switched, and the first print medium P1 is conveyed to the second conveyance path 24 (FIGS. 4B and 4C). In this case, the flapper 51 switches the conveyance direction so as to prevent the print medium P from being conveyed to the printing unit 8. Thereafter, the first print medium P1 is conveyed from the second conveyance path 24 to the first conveyance path 22 and the printing unit 8. After undergoing printing on the second surface, the first print medium P1 is conveyed to the discharge path 25 (FIG. 4D). In this case, the flapper 51 switches the conveyance direction so as to prevent the print medium P from being conveyed to the inversion path 23.

FIGS. 5A to 7 are views showing conveyance of the print media Pin a case of performing double-sided printing on a plurality of print media. The first print medium P1 fed from the sheet stacking unit 11 is conveyed through the supply path 21 and the first conveyance path 22, undergoes printing on the first surface by the printing unit 8, and is conveyed to the inversion path 23. In this case, the flapper 51 switches the conveyance direction so as to prevent the print medium P1 from being conveyed to the discharge path 25.

Figure 5A:
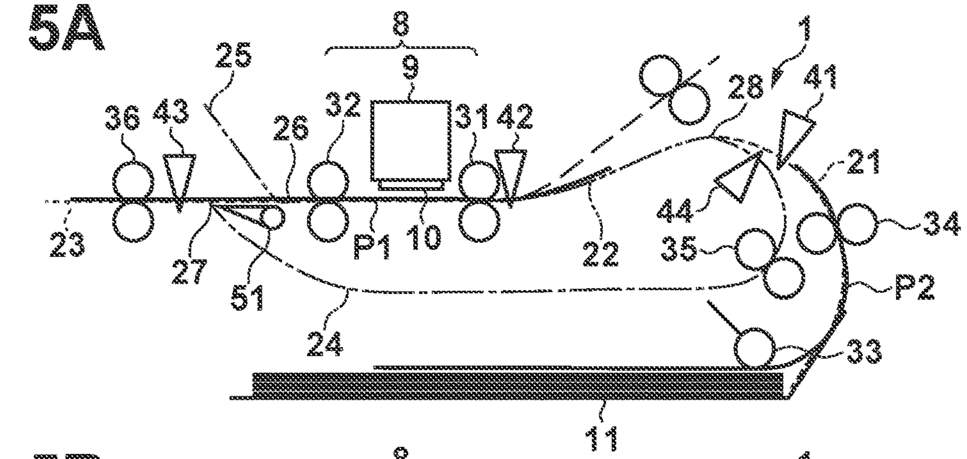
FIGS. 5A to 5D are views showing conveyance of the print media in a case of performing double-sided printing on a plurality of print media.

After the trailing end of the first print medium P1 is detected by the first sensor 41 provided in the supply path 21 and the first print medium P1 is conveyed by the predetermined amount after the detection of the trailing end, the second print medium P2 is fed from the sheet stacking unit 11 (FIG. 5A). After the leading end of the second print medium P2 is detected by the first sensor 41 and the second print medium P2 is conveyed by a predetermined amount after the detection of the leading end, the second print medium P2 is stopped in the first conveyance path 22.

Figure 5B:
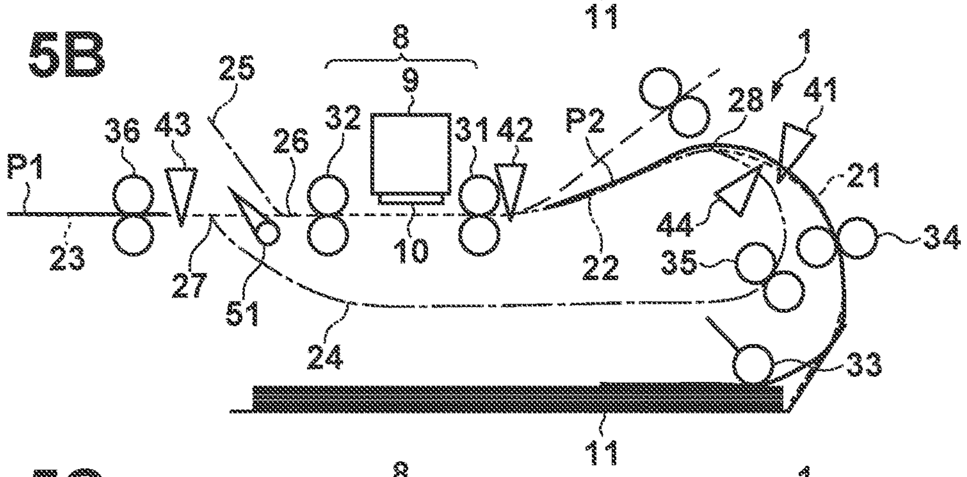

After the trailing end of the first print medium P1 is detected by the third sensor 43, the driving direction of the inversion roller 36 is switched, and the first print medium P1 is conveyed to the second conveyance path 24 (FIG. 5B). In this case, the flapper 51 switches the conveyance direction so as to prevent the print medium P1 from being conveyed to the printing unit 8. The conveyance of the first print medium P1 to the second conveyance path 24 and the conveyance of the second print medium P2 to the supply path 21 are simultaneously performed.

Figure 5C:
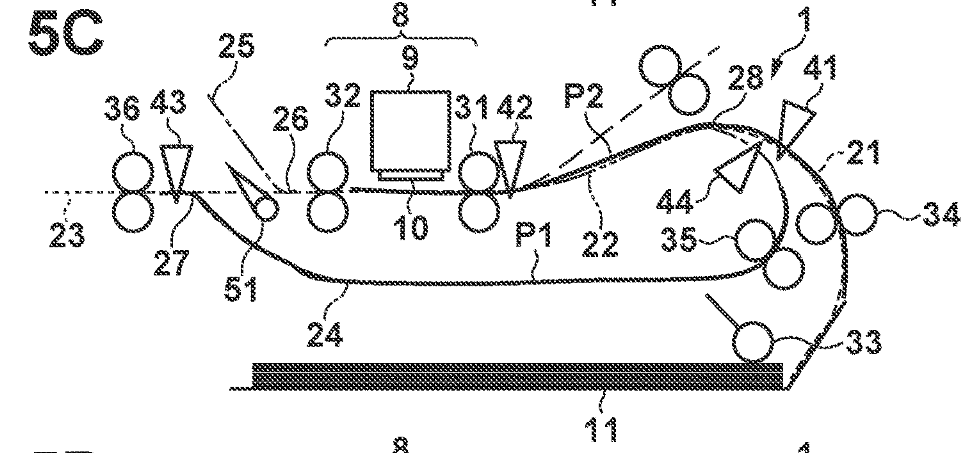

After the first print medium P1 is conveyed from the inversion path 23 to the second conveyance path 24 and conveyed by a predetermined amount after the leading end thereof is detected by the third sensor 43, conveyance of the second print medium P2 from the first conveyance path 22 to the printing unit 8 is started (FIG. 5C). In this case, the flapper 51 switches the conveyance direction so as to prevent the second print medium P2 from being conveyed to the discharge path 25.

Figure 5D:
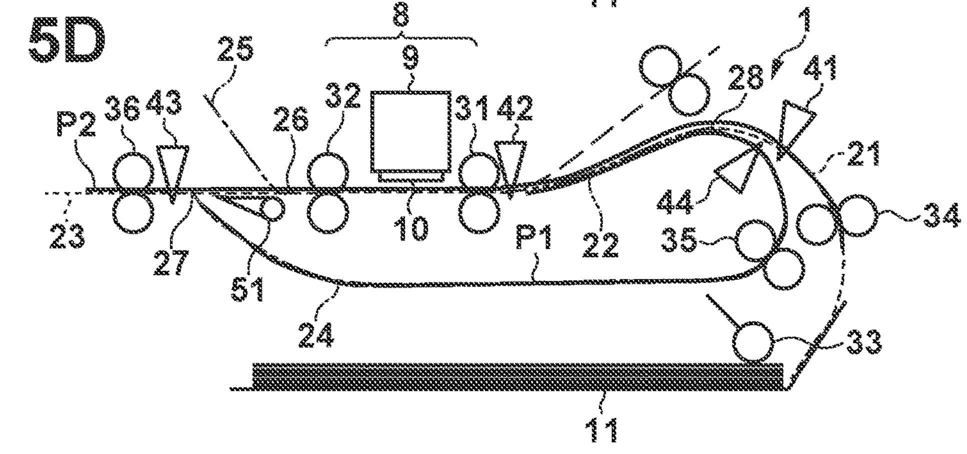

After the leading end of the first print medium P1 is detected by the fourth sensor 44 provided in the second conveyance path 24 and the first print medium P1 is conveyed by a predetermined amount after the detection of the leading end, the first print medium P1 is stopped in the first conveyance path 22. In this case, the second print medium P2 undergoing printing by the printing unit 8 and conveyed to the inversion path 23 and the first print medium P1 overlap in a region between the inverted sheet merging portion 28 and the upstream of the second sensor 42 provided in the first conveyance path 22. They overlap such that the second surface of the second print medium P2 and the second surface of the first print medium P1 contact each other. The first print medium P1 is stopped in the first conveyance path 22 until printing on the second print medium P2 ends (FIG. 5D).

After the trailing end of the second print medium P2 is detected by the second sensor 42 and the second print medium P2 is conveyed by a predetermined amount after the detection of the trailing end, the first print medium P1 is conveyed to the printing unit 8, undergoes printing on the second surface by the printing unit 8, and is conveyed to the discharge path 25. In this case, the flapper 51 switches the conveyance direction so as to prevent the first print medium P1 from being conveyed to the inversion path 23.

Figure 6A:
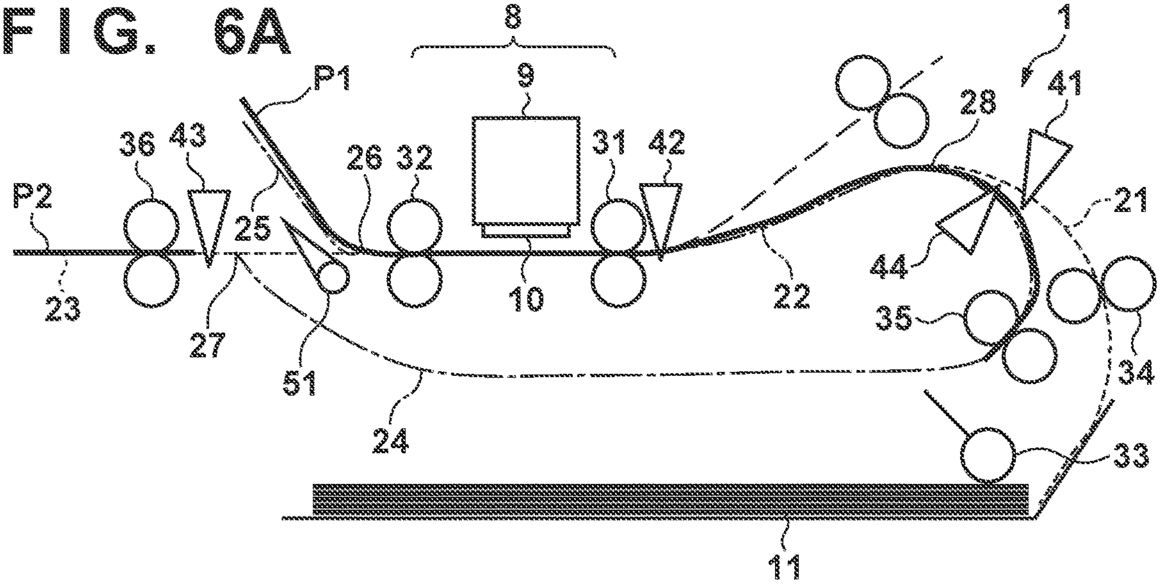
FIGS. 6A to 6C are views showing the conveyance of the print media in the case of performing double sided-printing on the plurality of print media.

After the trailing end of the second print medium P2 is detected by the third sensor 43, the driving direction of the inversion roller 36 is switched, and the second print medium P2 is conveyed to the second conveyance path 24 (FIG. 6A).

Figure 6B:
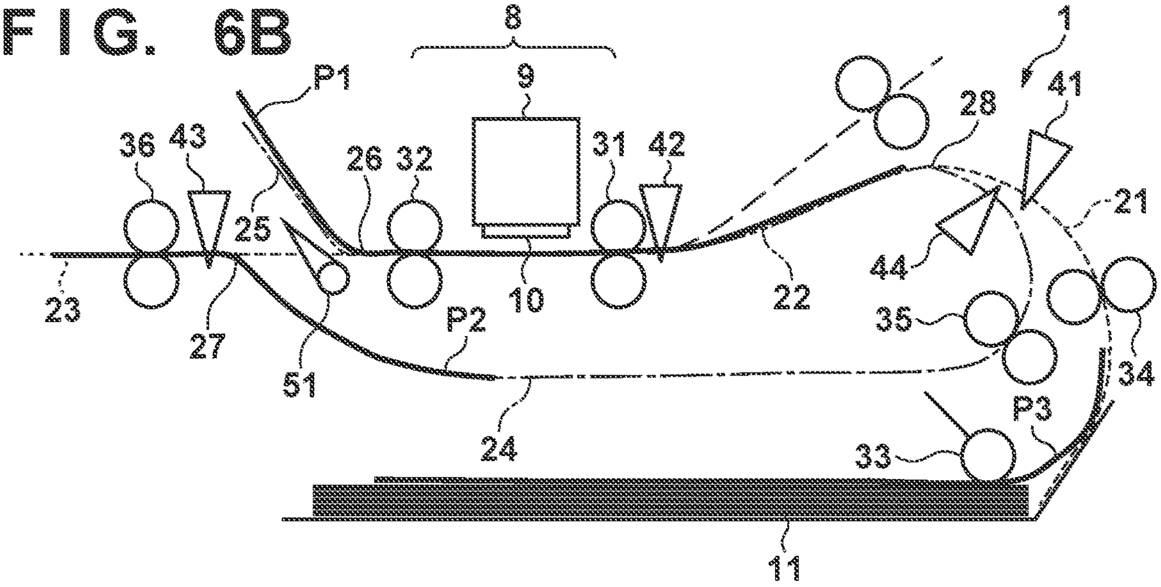
Figure 6C:
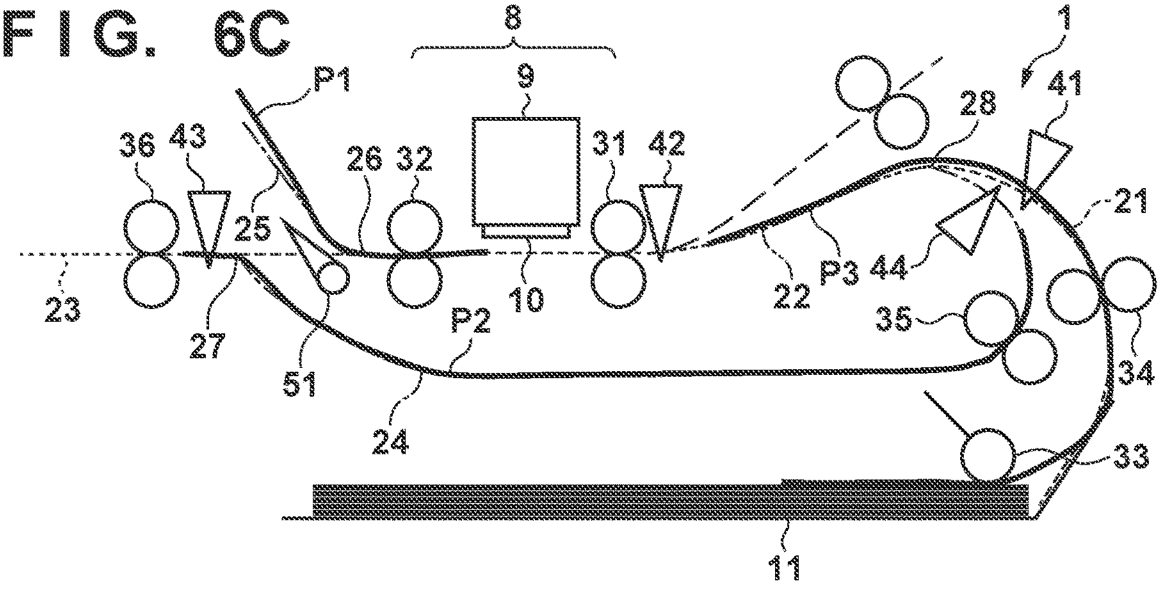

After the trailing end of the first print medium P1 is detected by the fourth sensor 44 and the first print medium P1 is conveyed by a predetermined amount after the detection of the trailing end, a third print medium P3 is fed from the sheet stacking unit 11 (FIGS. 6B and 6C). The third print medium P3 is conveyed from the supply path 21 to the first conveyance path 22, and conveyed to the printing unit 8.

After the leading end of the second print medium P2 is detected by the third sensor 43 and the second print medium P2 is conveyed by the predetermined amount after the detection of the leading end, the flapper 51 switches the conveyance direction so as to prevent the third print medium P3 from being conveyed to the discharge path 25.

Figure 7:
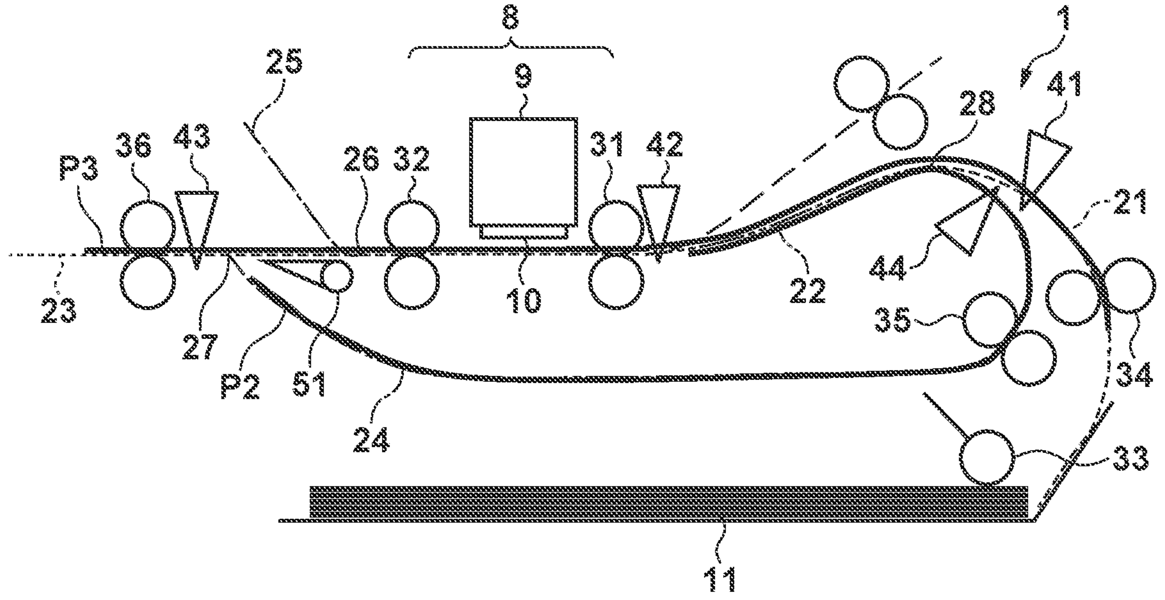
FIG. 7 is a view showing the conveyance of the print media in the case of performing double-sided printing on the plurality of print media.

While printing on the first surface of the third print medium P3 is performed by the printing unit 8 and the third print medium P3 is conveyed to the inversion path 23, the second print medium P2 is conveyed from the second conveyance path 24 to the first conveyance path 22. After the leading end of the second print medium P2 is detected by the fourth sensor 44 and the second print medium P2 is conveyed by the predetermined amount after the detection of the leading end, conveyance of the second print medium P2 is stopped in the first conveyance path 22. In this case, the third print medium P3 and the second print medium P2 overlap in the region between the inverted sheet merging portion 28 and the upstream of the second sensor 42 provided in the first conveyance path 22 (FIG. 7).

After the trailing end of the third print medium P3 is detected by the second sensor 42 and the third print medium P3 is conveyed by the predetermined amount after the detection of the trailing end, the second print medium P2 is conveyed to the printing unit 8, undergoes printing on the second surface by the printing unit 8, and is conveyed to the discharge path 25. In this case, the flapper 51 switches the conveyance path so as to prevent the second print medium P2 from being conveyed to the inversion path 23.

After the trailing end of the third print medium P3 is detected by the third sensor 43, the driving direction of the inversion roller 36 is switched, and the third print medium P3 is conveyed to the second conveyance path 24. The third print medium P3 is conveyed from the second conveyance path 24 to the first conveyance path 22 and the printing unit 8. After printing on the second surface of the third print medium P3 is performed by the printing unit 8, the third print medium P3 is conveyed to the discharge path 25.

Figure 8:
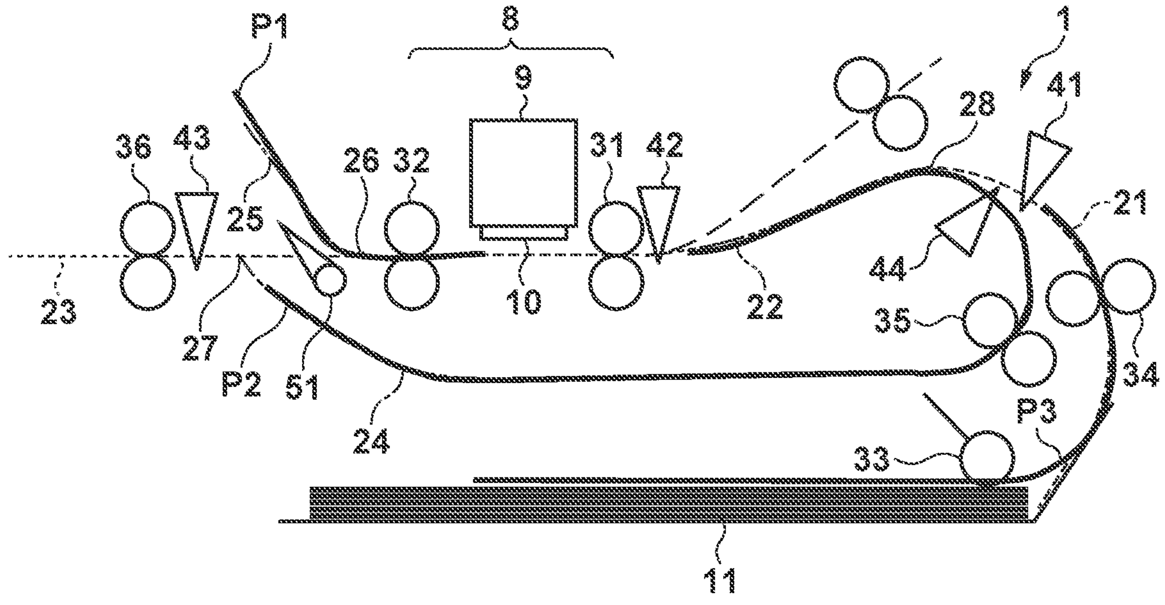
FIG. 8 is a view showing a timing at which the second print medium and the third print medium overlap in the first conveyance path.

FIG. 8 is a view showing a timing at which the second print medium P2 and the third print medium P3 overlap in the region between the inverted sheet merging portion 28 and the upstream of the second sensor 42 in the case of performing double-sided printing on the plurality of print media. If the density of an image to be printing is high or the temperature of the driving source rises, the conveyance speed decreases. If the conveyance speed decreases during printing on the second surface of the first print medium P1, the feeding timing of the third print medium P3 is delayed, so that the second print medium P2 is conveyed to the first conveyance path 22 before the third print medium P3. Also, if the temperature of the driving source of the feeding roller 33 and the first intermediate roller 34 rises, the feeding timing is delayed or the conveyance speed decreases, so that the second print medium P2 is conveyed to the first conveyance path 22 before the third print medium P3.

Normally, the third print medium P3 is conveyed to the first conveyance path 22 before the second print medium P2 as shown in FIG. 6C, but if the feeding timing of the third print medium P3 is delayed, the second print medium P2 may be conveyed to the first conveyance path 22 before the third print medium P3 as shown in FIG. 8.

<Control Unit>

Figure 9:
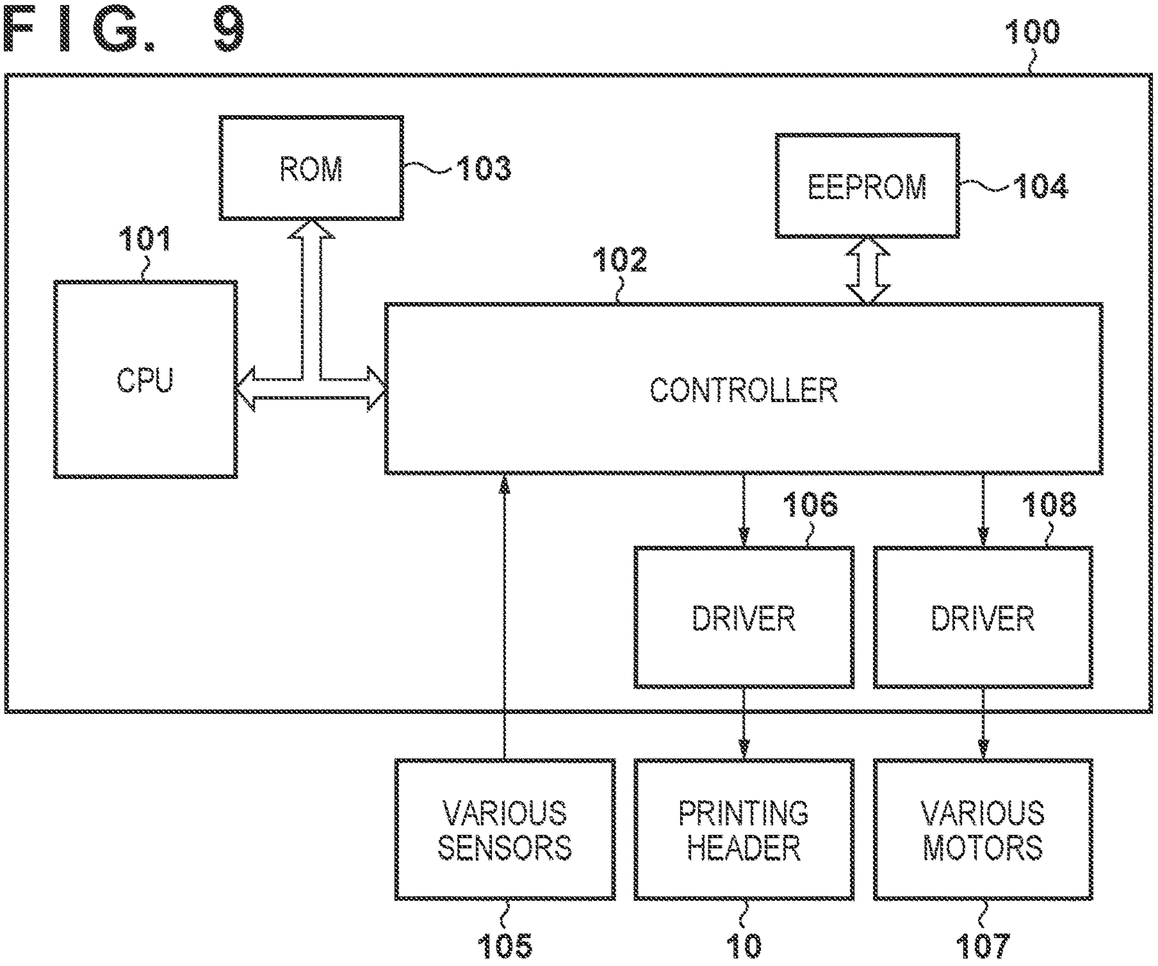
FIG. 9 is a block diagram showing the arrangement of a control system of the printing apparatus.

The arrangement of the control system of the printing apparatus 1 will be described with reference to FIG. 9. FIG. 9 is a block diagram of a control unit 100 that controls the printing apparatus 1.

The control unit 100 is a control circuit that controls the operation of each mechanical unit of the printing apparatus 1. A CPU 101 controls the entire printing apparatus 1. A controller 102 assists the CPU 101 and controls driving of various motors 107 and the printhead 10 in accordance with detection results of various sensors 105.

Various kinds of data and the control program of the CPU 101 are stored in a ROM 103. Various kinds of data are stored in an EEPROM 104. Note that as the ROM 103 and the EEPROM 104, other storage devices may be used.

A driver 108 drives the various motors 107. The various motors 107 include, for example, the driving sources of the respective rollers. A driver 106 drives the printhead 10. The various sensors 105 include a sensor that detects the position of the carriage 9, and a sensor disposed in the conveyance path of the print medium P to detect the print medium P.

A printing operation starts when, for example, a print job is received from a host computer, or a print job to print an original read by the reading unit 3 on the print medium P is generated.

Figure 10:
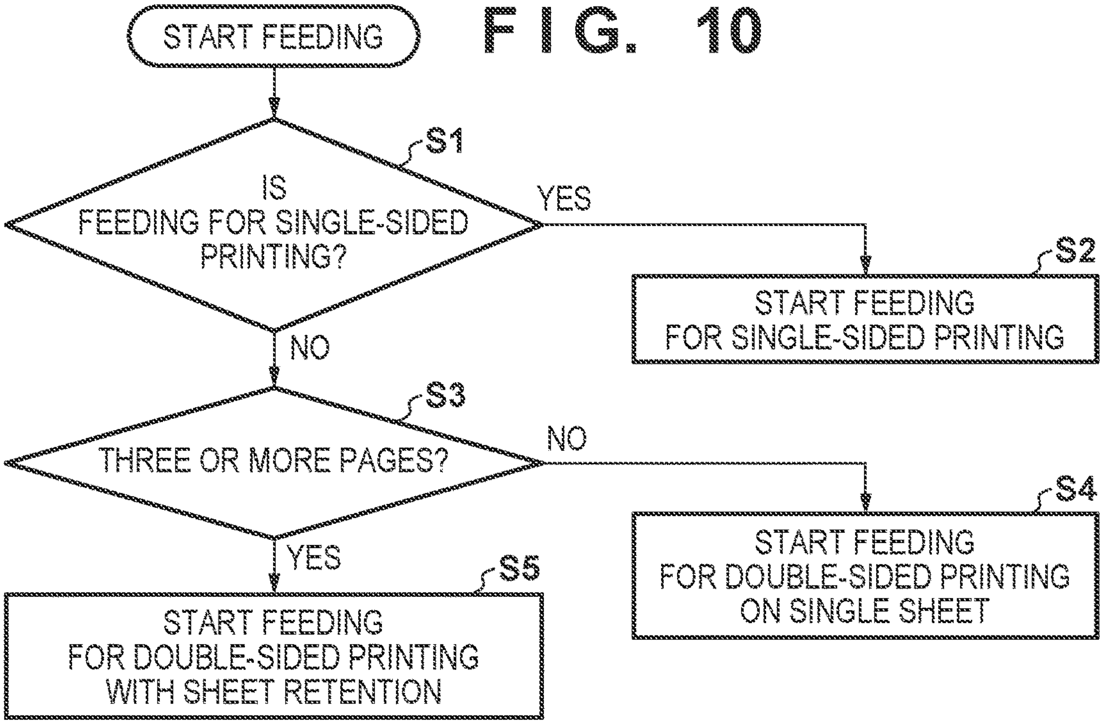
FIG. 10 is a flowchart illustrating a feeding operation of the printing apparatus.

FIGS. 10 and 11 are flowcharts illustrating control executed by the CPU 101, and exemplifies processing associated with driving in a case of performing double-sided printing on three print media.

FIG. 10 is a flowchart showing the feeding start operation of the printing apparatus 1 according to this embodiment. The operation of this flowchart is implemented by the CPU 101 executing the control program stored in the ROM 103.

In FIG. 10, when the printing apparatus 1 receives a print job from the host computer, the CPU 101 determines in step S1 whether the print job is for single-sided printing on the print medium P. If the print job is for single-sided printing, the CPU 101 advances the process to step S2; otherwise, the CPU 101 advances the process to step S3.

In step S2, the CPU 101 starts feeding for single-sided printing.

In step S3, the CPU 101 determines whether the print job is for printing of three or more pages. If the print job is for printing of three or more pages, the CPU 101 advances the process to step S5; otherwise, the CPU advances the process to step S4.

In step S4, since the print job can be completed with the single print medium P, the CPU 101 starts feeding for double-sided printing on a single sheet. In step S5, since printing is to be performed on multiple print media P, the CPU 101 starts feeding for double-sided printing with sheet retention.

Figure 11A:
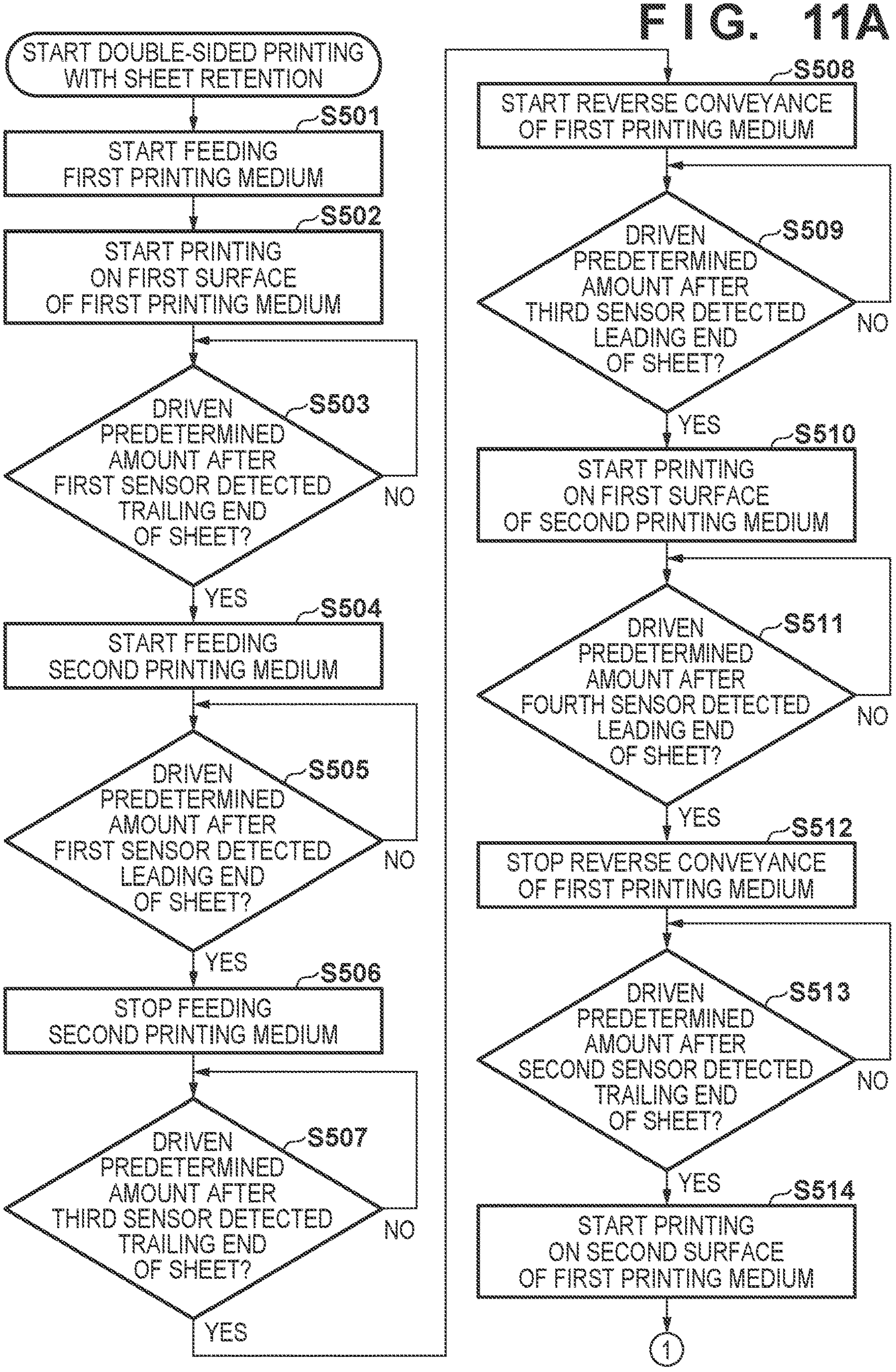
FIGS. 11A and 11B are flowcharts illustrating a printing operation of the printing apparatus.
Figure 11B:
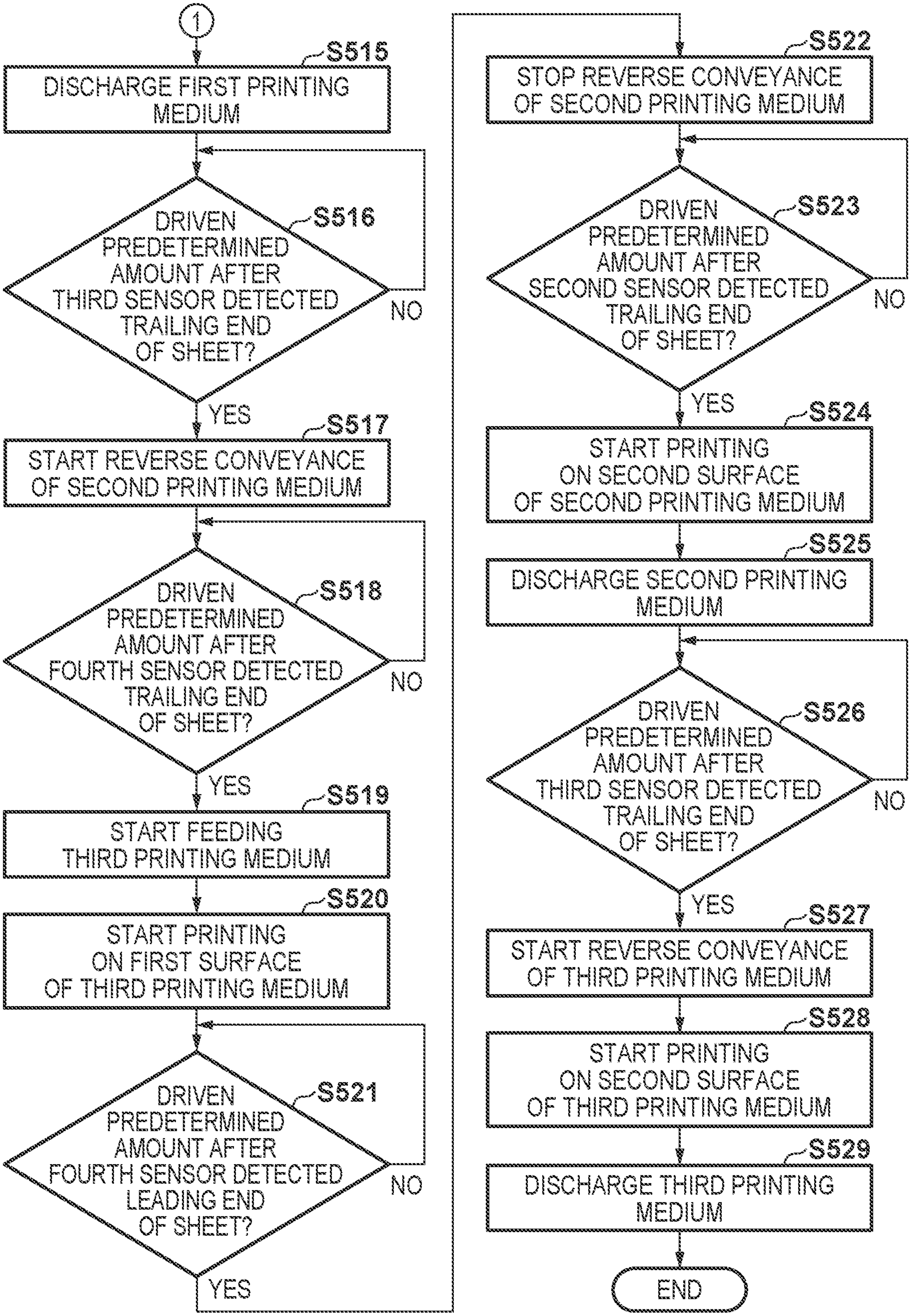

Next, FIGS. 11A and 11B are flowcharts illustrating the operation of double-sided printing with sheet retention. The operation of these flowcharts are also implemented by the CPU 101 executing the control program stored in the ROM 103.

If double-sided printing with sheet retention is started, in step S501, the CPU 101 feeds the first print medium P1 serving as the first sheet from the sheet stacking unit 11.

The fed first print medium P1 undergoes skew correction using the main conveyance roller 31, and is conveyed to the printing unit 8. The skew correction is performed by conveying the leading end of the first print medium P1 slightly downstream of the main conveyance roller 31 and, while stopping driving of the first intermediate roller 34, reversely driving the main conveyance roller 31 until the leading end of the first print medium P1 passes through the main conveyance roller 31, thereby making the leading end of the first print medium P1 follow the main conveyance roller 31. Note that the skew correction may be stop skew correction which is performed by abutting the first print medium P1 conveyed by the first intermediate roller 34 against the stopped main conveyance roller 31, or may be reverse rotation skew correction which is performed by making the first print medium P1 conveyed by the first intermediate roller 34 abut against the reversely-driven main conveyance roller 31. When the first print medium P1 is conveyed to the printing unit 8, the CPU 101 starts printing on the first surface in step S502. Once printing is started, the main conveyance roller 31 is switched to intermittent driving, and the first intermediate roller 34 and the inversion roller 36 are also switched from continuous driving to intermittent driving in synchronization with the main conveyance roller 31.

In step S503, the CPU 101 determines whether, after the trailing end of the first print medium P1 is detected by the first sensor 41, the first print medium P1 has been conveyed by a predetermined amount. If the first print medium P1 has been conveyed by the predetermined amount after the detection of the trailing end, the CPU 101 advances the process to step S504; otherwise, the CPU 101 waits.

In step S504, the CPU 101 starts feeding of the second print medium P2 serving as the second print medium from the sheet stacking unit 11. At this time, the first intermediate roller 34 is switched from intermittent driving to continuous driving. The positional relationship between the first print medium P1 and the second print medium P2 after the second print medium P2 is fed and slightly conveyed is as shown in FIG. 5A.

In step S505, the CPU 101 determines whether, after the leading end of the second print medium P2 is detected by the first sensor 41, the second print medium P2 has been conveyed by a predetermined amount. If the second print medium P2 has been conveyed by the predetermined amount, the CPU 101 advances the process to step S506; otherwise, the CPU 101 waits.

In step S506, the CPU 101 stops the second print medium P2, and continues printing and conveyance of the first print medium P1 alone.

In step S507, the CPU 101 determines whether, after the trailing end of the first print medium P1 is detected by the third sensor 43, the first print medium P1 has been conveyed by a predetermined amount. If the first print medium has been conveyed by the predetermined amount, the CPU 101 advances the process to step S508; otherwise, the CPU 101 waits.

In step S508, the CPU 101 switches the driving direction of the inversion roller 36 and drives it continuously, thereby starting inverting conveyance (reverse conveyance) of the first print medium P1. At this time, the positional relationship between the first print medium P1 and the second print medium P2 is as shown in FIG. 5B.

In step S509, the CPU 101 determines whether, after the leading end of the first print medium P1 having started inverting conveyance is detected by the third sensor 43, the first print medium P1 has been conveyed by a predetermined amount in the reverse conveyance direction. If the first print medium P1 has been conveyed by the predetermined amount, the CPU 101 advances the process to step S510; otherwise, the CPU 101 waits.

In step S510, the CPU 101 conveys the stopped second print medium P2 by the first intermediate roller 34, performs skew correction using the main conveyance roller 31, conveys the second print medium P2 to the printing unit 8, and then starts printing on the first surface of the second print medium P2. Once printing on the second print medium P2 is started, the first intermediate roller 34 is switched to intermittent driving in synchronization with the main conveyance roller 31. At this time, the positional relationship between the first print medium P1 and the second print medium P2 is as shown in FIG. 5C. After the inversion roller 36 is driven by a predetermined amount after the trailing end of the first print medium P1 is detected by the third sensor 43, the inversion roller 36 stops the inverting conveyance (reverse conveyance), and is switched to intermittent driving in the main conveyance direction (forward conveyance) in synchronization with the main conveyance roller 31. The first print medium P1 is reversely conveyed by the second intermediate roller 35.

In step S511, the CPU 101 determines whether, after the leading end of the first print medium P1 is detected by the fourth sensor 44, the first print medium P1 has been conveyed by a predetermined amount. If the first print medium P1 has been conveyed by the predetermined amount, the CPU 101 advances the process to step S512; otherwise, the CPU 101 waits.

In step S512, the CPU 101 stops the reverse conveyance of the first print medium P1. At this time, the positional relationship between the first print medium P1 and the second print medium P2 is as shown in FIG. 5D. At this time, the first print medium P1 and the second print medium P2 overlap in the first conveyance path 22, and the second print medium P2 is being conveyed intermittently.

In step S513, the CPU 101 determines whether, after the trailing end of the second print medium P2 is detected by the second sensor 42, the second print medium P2 has been conveyed by a predetermined amount. If the second print medium P2 has been conveyed by the predetermined amount, the CPU 101 advances the process to step S514; otherwise, the CPU 101 waits.

In step S514, the CPU 101 conveys the first print medium P1 by the second intermediate roller 35, performs skew correction using the main conveyance roller 31, conveys the first print medium P1 to the printing unit 8, and starts printing on the second surface of the first print medium P1. At this time, the skew correction is performed by conveying the leading end of the first print medium P1 slightly downstream of the main conveyance roller 31 and, while stopping driving of the second intermediate roller 35, reversely driving the main conveyance roller 31 until the leading end of the first print medium P1 passes through the main conveyance roller 31, thereby making the leading end of the first print medium P1 follow the main conveyance roller 31. Note that the skew correction may be stop skew correction which is performed by abutting the first print medium P1 conveyed by the second intermediate roller 35 against the stopped main conveyance roller 31, or may be reverse rotation skew correction which is performed by making the first print medium P1 conveyed by the second intermediate roller 35 abut against the reversely-driven main conveyance roller 31. Once printing on the first print medium P1 is started, the second intermediate roller 35 is switched from continuous driving to intermittent driving in synchronization with the main conveyance roller 31.

In step S515, after the trailing end of the second print medium P2 is conveyed up to a position after the flapper 51, the CPU 101 switches the flapper 51 to the position for conveying the first print medium P1 to the discharge path 25. Then, the first print medium P1 is conveyed to the discharge path 25.

In step S516, the CPU 101 determines whether, after the trailing end of the second print medium P2 is detected by the third sensor 43, the second print medium P2 has been conveyed by a predetermined amount. If the second print medium P2 has been conveyed by the predetermined amount, the CPU 101 advances the process to step S517; otherwise, the CPU 101 waits.

In step S517, the CPU 101 switches the driving direction of the inversion roller 36 and drives it continuously, thereby starting inverting conveyance (reverse conveyance) of the second print medium P2. At this time, the positional relationship between the first print medium P1 and the second print medium P2 is as shown in FIG. 6A.

In step S518, the CPU 101 determines whether, after the trailing end of the first print medium P1 is detected by the fourth sensor 44, the first print medium P1 has been conveyed by a predetermined amount. If the first print medium P1 has been conveyed by the predetermined amount, the CPU 101 advances the process to step S519; otherwise, the CPU 101 waits. After the second intermediate roller 35 is driven by a predetermined amount after the detection of the trailing end of the first print medium P1 by the fourth sensor 44, the second intermediate roller 35 is switched from intermittent driving to continuous driving, and reversely conveys the second print medium P2.

In step S519, the CPU 101 starts feeding of the third print medium P3 serving as the third print medium from the sheet stacking unit 11. The feeding roller 33 and the first intermediate roller 34 are continuously driven, and the third print medium P3 is fed. After the third print medium P3 is slightly conveyed, the positional relationship among the first print medium P1, the second print medium P2, and the third print medium P3 is as shown in FIGS. 6B and 6C.

In step S520, the CPU 101 conveys the third print medium P3 by the first intermediate roller 34, performs skew correction using the main conveyance roller 31, conveys the third print medium P3 to the printing unit 8, and starts printing on the first surface of the third print medium P3. Once printing on the third print medium P3 is started, the first intermediate roller 34 is switched from continuous driving to intermittent driving in synchronization with the main conveyance roller 31. After the inversion roller 36 is driven by a predetermined amount after the trailing end of the second print medium P2 is detected by the third sensor 43, the inversion roller 36 stops the inverting conveyance (reverse conveyance), and is switched to intermittent driving in the main conveyance direction (forward conveyance) in synchronization with the main conveyance roller 31. The second print medium P2 is reversely conveyed by the second intermediate roller 35.

In step S521, the CPU 101 determines whether, after the leading end of the second print medium P2 is detected by the fourth sensor 44, the second print medium P2 has been conveyed by a predetermined amount. If the second print medium P2 has been conveyed by the predetermined amount, the CPU 101 advances the process to step S522; otherwise, the CPU 101 waits.

In step S522, the CPU 101 stops the reverse conveyance of the second print medium P2. At this time, the positional relationship between the second print medium P2 and the third print medium P3 is as shown in FIG. 7.

In step S523, the CPU 101 determines whether, after the trailing end of the third print medium P3 is detected by the second sensor 42, the third print medium P3 has been conveyed by a predetermined amount. If the third print medium P3 has been conveyed by the predetermined amount, the CPU 101 advances the process to step S524; otherwise, the CPU 101 waits.

In step S524, the CPU 101 conveys the second print medium P2 by the second intermediate roller 35, performs skew correction using the main conveyance roller 31, conveys the second print medium P2 to the printing unit 8, and starts printing on the second surface of the second print medium P2. Once printing on the second print medium P2 is started, the second intermediate roller 35 is switched from continuous driving to intermittent driving in synchronization with the main conveyance roller 31.

In step S525, after the trailing end of the third print medium P3 is conveyed up to a position after the flapper 51, the CPU 101 switches the flapper 51 to the position for conveying the second print medium P2 to the discharge path 25. Then, the second print medium P2 is conveyed to the discharge path 25.

In step S526, the CPU 101 determines whether, after the trailing end of the third print medium P3 is detected by the third sensor 43, the third print medium P3 has been conveyed by a predetermined amount. If the third print medium P3 has been conveyed by the predetermined amount, the CPU 101 advances the process to step S527; otherwise, the CPU 101 waits.

In step S527, the CPU 101 switches the driving direction of the inversion roller 36 and drives it continuously, thereby starting inverting conveyance (reverse conveyance) of the third print medium P3. After the second intermediate roller 35 is driven by a predetermined amount after the detection of the trailing end of the second print medium P2 by the fourth sensor 44, the second intermediate roller 35 is switched from intermittent driving to continuous driving, and reversely conveys the third print medium P3.

In step S528, the CPU 101 conveys the third print medium P3 by the second intermediate roller 35, performs skew correction using the main conveyance roller 31, conveys the third print medium P3 to the printing unit 8, and starts printing on the second surface of the third print medium P3. Once printing on the third print medium P3 is started, the second intermediate roller 35 is switched from continuous driving to intermittent driving in synchronization with the main conveyance roller 31.

In step S529, the CPU 101 conveys the third print medium P3 to the discharge path 25.

Note that in a case of performing double-sided printing on a plurality of print media, steps S518 to S527 of the flowchart of FIG. 11B are repeated.

As has been described above, in the above-described embodiment, the intermediate roller configured to convey a print medium from the supply path to the printing unit and the intermediate roller configured to convey the print medium from the inversion path to the printing unit are provided separately. Accordingly, it is possible to draw the first print medium into the inversion path up to a position after the intermediate roller during printing on the next print medium. With this, it is unnecessary to make the conveyance path length from the drawing portion to the intermediate roller larger than the maximum sheet length in order to completely draw the first print medium into the inversion path. Thus, the apparatus size can be reduced.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-078302, filed May 11, 2022, which is hereby incorporated by reference herein in its entirety.

What is claimed is:

1. A printing apparatus comprising:

a supply unit configured to supply a print medium;

a supply path configured to convey the print medium supplied from the supply unit;

a first conveyance path configured to convey the print medium from the supply path;

a conveyance roller provided on the first conveyance path and configured to convey a print medium in a first direction;

a printing unit provided on a downstream side of the conveyance roller in the first direction and configured to print an image on a first surface and a second surface on a back of the first surface of the print medium conveyed to the first direction;

an inversion roller provided on the downstream side of the printing unit in the first direction, and configured to convey the print medium in a second direction different from the first direction; and a second conveyance path configured to branch from the first conveyance path at a branch portion between the printing unit and the inversion roller and to convey the print medium conveyed in the second direction by the inversion roller from the branch portion to an upstream side of the conveyance roller in the first direction, wherein, in a case of performing printing on both sides of a plurality of print media, the plurality of print media are conveyed such that a first print medium supplied from the second conveyance path and a second print medium supplied from the supply path overlap between the conveyance roller and supply path.

2. The printing apparatus according to claim 1, further comprising a first intermediate roller provided in the supply path, a second intermediate roller provided in the second conveyance path, wherein the conveyance roller conveys the print medium conveyed by one of the first intermediate roller and the second intermediate roller to the printing unit, wherein the print medium conveyed from the first conveyance path undergoes skew correction using the first intermediate roller and the conveyance roller, and the print medium conveyed from the second conveyance path undergoes skew correction using the second intermediate roller and the conveyance roller.

3. The printing apparatus according to claim 2, further comprising driving sources configured to independently drive the first intermediate roller and the second intermediate roller.

4. The printing apparatus according to claim 1, wherein the first print medium and the second print medium are overlapped in the first conveyance path such that the second surface of the first print medium having undergone printing on the first surface and a second surface of the second print medium not having undergone printing on a first surface contact each other.

5. The printing apparatus according to claim 1, wherein conveyance of the first print medium to the second conveyance path and conveyance of the second print medium to the supply path are simultaneously performed.

6. The printing apparatus according to claim 5, wherein the printing apparatus controls such that, during printing on the first surface of the first print medium by intermittent conveyance, a leading end of the second print medium is conveyed up to the first conveyance path, and during conveyance of the first print medium to the second conveyance path, printing on the first surface of the second print medium by intermittent conveyance is started.

7. The printing apparatus according to claim 1, wherein a sum of a conveyance path length of the second conveyance path and a conveyance path length of the first conveyance path is not less than a maximum length of the print medium on which the printing apparatus can perform double-sided printing.

8. The printing apparatus according to claim 1, further comprising a first sensor arranged in the supply path, and capable of detecting an end portion of the print medium.

9. The printing apparatus according to claim 1, further comprising a second sensor arranged in the first conveyance path, and capable of detecting an end portion of the print medium.

10. The printing apparatus according to claim 1, further comprising a third sensor arranged on an upstream side of the inversion roller in the first direction, and capable of detecting an end portion of the print medium.

11. The printing apparatus according to claim 10, further comprising a switching unit arranged on an upstream side of the third sensor in the first direction, and configured to switch the conveyance direction of the print medium.

12. The printing apparatus according to claim 11, wherein the switching unit is configured to switch a state in which the print medium is conveyed toward the inversion roller and a state in which the print medium is conveyed toward a discharge path.

13. The printing apparatus according to claim 1, further comprising a fourth sensor provided in the second conveyance path on an upstream side of a merging position with the first conveyance path, and capable of detecting an end portion of the print medium.

14. A method of controlling a printing apparatus having a supply unit configured to supply a print medium, a supply path configured to convey the print medium supplied from the supply unit, a first conveyance path configured to convey the print medium from the supply path, a conveyance roller provided on the first conveyance path and configured to convey a print medium in a first direction, a printing unit provided on a downstream side of the conveyance roller in the first direction and configured to print an image on a first surface and a second surface on a back of the first surface of the print medium conveyed to the first direction, an inversion roller provided on the downstream side of the printing unit in the first direction, and configured to convey the print medium in a second direction different from the first direction, and a second conveyance path configured to branch from the first conveyance path at a branch portion between the printing unit and the inversion roller and to convey the print medium conveyed in the second direction by the inversion roller from the branch portion to an upstream side of the conveyance roller in the first direction, the method comprising:

conveying, in a case of performing printing on both sides of a plurality of print media, the plurality of print media such that a first print medium supplied from the second conveyance path and a second print medium supplied from the supply path overlap between the conveyance roller and supply path.

* * * * *